US008902185B2

(12) United States Patent
Tanzawa et al.

(10) Patent No.: US 8,902,185 B2
(45) Date of Patent: Dec. 2, 2014

(54) SCROLLING SCREEN APPARATUS, METHOD FOR SCROLLING SCREEN, AND GAME APPARATUS

(71) Applicant: Kabushiki Kaisha Square Enix, Tokyo (JP)

(72) Inventors: Yuuichi Tanzawa, Tokyo (JP); Daisuke Miyata, Tokyo (JP); Yoshimasa Asao, Tokyo (JP); Tetsuro Uchida, Tokyo (JP); Kazuya Tomii, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 111 days.

(21) Appl. No.: 13/633,401

(22) Filed: Oct. 2, 2012

(65) Prior Publication Data

US 2013/0207909 A1 Aug. 15, 2013

(30) Foreign Application Priority Data

Feb. 9, 2012 (JP) .................................. 2012-025817

(51) Int. Cl.
*G06F 3/041* (2006.01)
*G09G 5/34* (2006.01)
*G06F 3/0485* (2013.01)

(52) U.S. Cl.
CPC ...... *G06F 3/041* (2013.01); *G09G 5/34* (2013.01); *G06F 3/0485* (2013.01); *G09G 2354/00* (2013.01)
USPC .......................................................... 345/173

(58) Field of Classification Search
CPC ... G06F 3/041; G06F 3/0485; G06F 3/04855; G06F 2203/0339; G06F 2203/04808; G09G 5/34; G09G 2354/00

USPC .......................................................... 345/173
See application file for complete search history.

(56) References Cited

U.S. PATENT DOCUMENTS

2005/0130738 A1 6/2005 Miyamoto et al.
2006/0277489 A1 12/2006 Maehiro et al.
(Continued)

FOREIGN PATENT DOCUMENTS

JP 10-161628 A 6/1998

OTHER PUBLICATIONS

Search report from E.P.O., mail date is Jul. 30, 2014.

*Primary Examiner* — Christopher E Leiby
(74) *Attorney, Agent, or Firm* — Greenblum & Bernstein, P.L.C.

(57) ABSTRACT

[Problem] The present invention intends to provide a scrolling screen apparatus, a method for scrolling screen, and a game apparatus, which prevent from scrolling display screen by user's misoperation and scroll display screen with intuitive operation.
[Method of solution] A control device 5 of the present invention scrolls the display screen by the amount of displacement corresponding to the displacement vector of each input coordinate, in a displacement scroll mode between the input of the touch coordinates and the input of the release coordinates to the coordinate input device 3 and, meanwhile the control device 5 scrolls the display screen by the amount of displacement corresponding to the scroll distance which is the sum total of the distances between the touch coordinates, each sampling coordinate and release coordinates read from the coordinate storage device 4, in an inertia scroll mode after the input of release coordinates. For example, the present invention scrolls the display screen by the amount of displacement corresponding to the sliding distance of the user's finger on the display.

9 Claims, 6 Drawing Sheets

(56) References Cited

U.S. PATENT DOCUMENTS

| | | | |
|---|---|---|---|
| 2010/0188352 A1* | 7/2010 | Ikeda | 345/173 |
| 2011/0072388 A1* | 3/2011 | Merrell et al. | 715/784 |
| 2011/0285649 A1 | 11/2011 | Ogawa et al. | |
| 2012/0068945 A1* | 3/2012 | Sugeda et al. | 345/173 |
| 2012/0075352 A1* | 3/2012 | Mizutani et al. | 345/684 |
| 2012/0322557 A1 | 12/2012 | Tanzawa | |

* cited by examiner (a)

(b)

SCROLLING SCREEN APPARATUS, METHOD FOR SCROLLING SCREEN, AND GAME APPARATUS

TECHNICAL FIELD

For example, the present invention relates to a scrolling screen apparatus so as to scroll a display screen of a touch panel, a method for scrolling screen, and a game apparatus equipped the scrolling screen apparatus. Namely the present invention performs measurement of the distance during touch operation, and inertia scrolling of the display screen corresponding to the distance.

Conventional information processing apparatuses such as cellar phones and personal computers perform scrolling-up, down, left and right, of the display screen in response to operation by input device. For example, in case of a cellar phone which has a touch panel, a user can scroll the display screen by sliding his finger on the touch panel.

Further scrolling control apparatuses which control scrolling of the display screen in a more similar way to natural physical phenomenon is well known (Patent document 1). The invention of Patent document 1 performs control in a displacement scroll mode during continuous input of coordinates from the coordinate input device, and after termination of the input to the coordinate input device it performs control in an inertia scroll mode. Specifically, the invention of Patent document 1 scrolls the display screen by the vector equal to the displacement vector of the input coordinates during the displacement scroll mode, meanwhile it scrolls the display screen by the vector proportional to the displacement vector of the input coordinates just before the termination of the coordinate input during the inertia scroll mode. Namely during touch panel operation by user's finger, the invention of Patent document 1 scrolls the display screen along the movement of the finger. Meanwhile, when users perform an operation like flicking on the touch panel, the invention of Patent document 1 scrolls the display screen corresponding to the displacement vector at the moment of flicking and then gradually decreases the speed of scrolling with a lapse of time.

PRIOR ART PUBLICATION

Patent document

Patent document 1: Japanese patent publication No. H10-161628.

SUMMARY OF INVENTION

Problems to be Solved by the Invention

At the present time, the size of touch panel increase and the use of touch panel becomes diversified. For example there is a game apparatus displaying a game image in a touch panel, and a user can perform input operation concerning game proceeding by finger touch operation to the touch panel. In particular, the execution of the action games in game apparatus with large touch panel provides high realistic games.

However in case of proving action games with large touch panel, a user have to operate touch panel frequently. For example, a user proceeds with games by selective and repeated actions, which are touching a point of the touch panel, sliding his finger on the touch panel and flicking display of the touch panel by finger. If scrolling of the display screen by the vector proportional to the displacement vector of the input coordinates just before the termination of coordinate inputting in the inertia scroll mode after termination of the input is performed in this situation, there is a problem that unintentional scrolling for users is performed. Namely when users perform an operation like flicking on the touch panel, the invention of Patent document 1 scrolls the display screen corresponding to the displacement vector at the moment of flicking. Therefore in case that a user swiftly flicks the screen by mistake despite the intention of touching a point of the touch panel, there is a problem that unintentional large amount of scrolling of the display screen is performed.

Therefore there is a demand for a scrolling screen apparatus, a method for scrolling screen, and a game apparatus, which prevent from scrolling display screen by user's misoperation and scroll display screen with intuitive operation.

Means for Solving the Problem

The inventor of the present invention examined means for solving the above problem of the conventional invention, and found that prevention from scrolling display screen by user's misoperation and scrolling operation of display screen with intuitive operation are realized by scrolling the display screen by the amount of displacement corresponding to the sliding distance of the user's finger on the touch panel when the inertia like scrolling control is performed, after the termination of the input to the coordinate input device.

Further the inventor completed the present invention because the inventor realized that the above problem of the conventional invention can be solved by the above knowledge. Specifically, the present invention comprises following structures.

A first aspect of the present invention relates to a scrolling screen apparatus 10. The scrolling screen apparatus 10 of the present invention comprises an image display device 1, an image storage device 2, a coordinate input device 3, a coordinate storage device 4 and a control device 5.

The display device 1 can display images.

The image storage device 2 stores the image data to be displayed in the display device 1.

The coordinates on the display device 1 are input to the coordinate input device 3.

The coordinate storage device 4 stores touch coordinates which are a first input to the coordinate input device 3, release coordinates which were input just before the termination of coordinate inputting to the coordinate input device 3 and a plurality of sampling coordinates which are input to the coordinate input device 3 between the input of the touch coordinates and the input of the release coordinates.

The control device 5 makes the image display device 1 display the image read from the image storage device 2, and scrolls the display screen of the image display device 1 corresponding to the data of each coordinate stored in the coordinate storage device 4.

Specifically, the control device 5 scrolls the display screen by the amount of displacement corresponding to the displacement vector of each input coordinate, in the displacement scroll mode between the input of the touch coordinates and the input of the release coordinates to the coordinate input device 3.

Meanwhile, the control device 5 scrolls the display screen by the amount of displacement corresponding to the scroll distance which is the sum total of the distances between the touch coordinates, each sampling coordinates and the release coordinates read from the coordinate storage device 4, in the inertia scroll mode after the input of the release coordinates.

As the above structure, scrolling of the display screen along the movement of user's finger is performed by scrolling by the amount of displacement corresponding to the displacement vector of each input coordinate, in the displacement scroll mode during coordinate inputting to the coordinate storage device 4. Meanwhile, scrolling of the display screen corresponding to the sliding distance of user's finger can be performed by scrolling by the amount of displacement corresponding to the scroll distance which is the sum total of the distances between the touch coordinates, each sampling coordinate and release coordinates in the inertia scroll mode after the termination of the input to the coordinate storage device 4. In this way if a user touches the screen momentarily by mistake, the large amount of scrolling of the display screen does not occur because the present invention performs scrolling corresponding to the sliding distance of user's finger on the display. Therefore the present invention prevents from the large amount of scrolling of the display screen by mistake.

Further, for example, it is found that a user who plays action games provided with large touch panel naturally take an action that the user slide his finger on the screen with a certain long track and then the user detach his finger from the screen. Especially, in case that the user wants a large amount of scrolling of the display screen, it is found that the user takes a sliding action with a relatively long track. Meanwhile, in case that the user wants a small amount of scrolling of the display screen, it is found that the user takes a sliding action with a relatively short track.

On this point, because the present invention changes the amount of the scrolling of the display screen corresponding to the sliding distance of user's finger on the display in the inertia scroll mode, for example, the large amount of scrolling is performed when the user take a sliding action with a relatively long track, and the small amount of scrolling is performed when the user take a sliding action with a relatively short track. Therefore users can execute intuitive scroll operation by the scrolling screen apparatus of the present invention.

It is preferable that after the input of the release coordinate to the coordinate input device 3, the control device 5 of the scrolling screen apparatus 10 of the present invention performs control in the inertia scroll mode when the scroll distance is longer than a predetermined threshold value, and the control device 5 stops scrolling in the display screen when the scroll distance is shorter than a predetermined threshold value.

As the above structure, the display screen is controlled not to scroll in case that a user touches the screen momentarily by mistake, by scrolling the display screen only when the scroll distance, which is the total sum of the distances between each input coordinate, is longer than a predetermined threshold value. Therefore the scrolling of the display screen by use's momentarily mistake is effectively prevented in the situation required frequent touch operation, such as action games played with large touch panel.

It is preferable that the scrolling screen apparatus 10 of the present invention further comprises a coordinate extraction device 6. The coordinate extraction device 6 extracts a plurality of sampling coordinates, which are input to the coordinate input device 3 within a predetermined period of time just before the input of the release coordinates to the coordinate input device 3, from the coordinate storage device 4. In this case, it is preferable that the control device 5 scrolls the display screen by the amount of displacement corresponding to the scroll distance which is the sum total of the distances between each sampling coordinate and the release coordinates, which are extracted by the coordinate extraction device 6, in the inertia scroll mode.

As the above structure, scrolling operation which properly reflects user's intention can be realized by changing the amount of the displacement of scrolling of the display screen corresponding to the sum total of the distances between the sampling coordinates, which are input to the coordinate input device 3 within a predetermined period of time just before input of the release coordinates to the coordinate input device 3, and the release coordinates. For example, if the sum total of all the input coordinates from the first touch coordinates to the release coordinates are calculated at all time, in case that the user slides his finger on the screen slowly and then detach his finger, a large amount of scrolling of the display screen may be occurred despite low speed of sliding operation on the screen. However the scrolling control like this is unnatural. More natural scrolling control is accomplished by calculating the sum total of the distance between the input coordinates which are input within a predetermined period of time (e.g. 1 second) just before the input of the release coordinates to the coordinate input device 3, because the display screen can be scrolled corresponding to the sliding distance by the user's finger on the touch panel within the predetermined time.

The image storage device 2 may be a storage storing image data of the game space to be displayed in the image display device 1 in the scrolling screen apparatus 10 of the present invention. It is preferable that the control device 5 reads the image data of the game space from the image storage device 2 and makes the image display device 1 display the image data, and scrolls a point of view in the game space to be displayed in the image display device 1 corresponding to the data of each input coordinate stored in the coordinate storage device 4. Further, it is preferable that the control device 5 scrolls the point of view by the amount of displacement corresponding to the displacement vector of each input coordinate and displays the game space in the image display device 1 on the basis of the point of view in the displacement scroll mode, and meanwhile the control device 5 scrolls the point of view by the amount of displacement corresponding to the scroll distance which is the sum total of the distances between the touch coordinates, each sampling coordinate and the release coordinates read from the coordinate storage device 4 and displays the game space in the image display device 1 on the basis of the point of view in the inertia scroll mode.

Like this, the scrolling screen apparatus 10 of the present invention may scroll the point of view in the game space, generate a game space on the basis of the data of the scrolled point of view and display the game space in the image display device 1. Besides, the image storage device 2 may store the data about characters and objects in the game space, characters and objects in the game space may be generated on the basis of the data of the scrolled point of view and displayed in the image display device 1.

A second aspect of the present invention relates to a method for scrolling screen. Namely, the method for scrolling screen of the second aspect is executed by the scrolling screen apparatus of the first aspect mentioned above.

The method for scrolling screen of the present invention reads image data from a image storage device, display the image in a image display device, and scroll the display screen of the image display device on the basis of data of each input coordinate which is stored an coordinates storage device.

The method for scrolling screen of the present invention comprises:

a step of inputting coordinates on the image display device to a coordinate input device;

a step of storing touch coordinates which are a first input to the coordinate input device 3, release coordinates which were input just before the termination of coordinate inputting to the coordinate input device 3 and a plurality of sampling coordinates which are input to the coordinate input device 3 between the input of the touch coordinates and the input of the release coordinates to the coordinate storage method;

a step of scrolling the display screen by the amount of displacement corresponding to the displacement vector of each input coordinate, between the input of the touch coordinates and the input of the release coordinates to the coordinate input device; and, a step of scrolling the display screen by the amount of displacement corresponding to the scroll distance which is the sum total of the distances between the touch coordinates, each sampling coordinate and release coordinates, after the input of the release coordinates to the coordinate input device 3.

A third aspect of the present invention relates to a game apparatus 20.

Namely, the game apparatus 20 of the third aspect comprises the scrolling screen apparatus of the first aspect mentioned above.

Furthermore, the game apparatus 20 of the third aspect can display an image in the touch panel 300 on the basis of a card data read by a card reader 262 and control scrolling of the display screen of the touch panel by the scrolling screen apparatus.

Specifically, the game apparatus 20 comprises a card reader 262, a touch panel 300 which displays data read by the card reader 262 and a scrolling screen apparatus 200 which scrolls the display screen of the touch panel.

The card reader 262 comprises a panel 263 where a card printed code containing predetermined card data is set on, and a detection device 265 which reads the code of the card set on the panel and detects the card data, The touch panel 300 comprises an image display device 290 able to display image and a coordinate input device 261 to input coordinates on the image display device.

The scrolling screen apparatus 200 comprises:

an image storage device 280 which stores image data to be displayed in the image display device 290 of the touch panel 300;

a coordinate storage device 270 which stores touch coordinates which are a first input to the coordinate input device 261 of the touch panel 300, release coordinates which were input just before the termination of coordinate inputting to the coordinate input device 261 and a plurality of sampling coordinates which are input to the coordinate input device 261 between the input of the touch coordinates and the input of the release coordinates; and, a control device 210 which reads the image data from the image storage device 280 on the basis of the card data detected by the detection device 265 of the card reader 262, makes the image display device 290 of the touch panel 300 display the image data, and scrolls the display screen of the image display device 290 corresponding to the data of each input coordinate stored in the coordinate storage device 270.

The control device 210 scrolls the display screen by the amount of displacement corresponding to the displacement vector of each input coordinate, in the displacement scroll mode between the input of the touch coordinates and the input of the release coordinates to the coordinate input device 261 and, scrolls the display screen by the amount of displacement corresponding to the scroll distance which is the sum total of the distances between the touch coordinates, each sampling coordinate and the release coordinates read from the coordinate storage device 270, in the inertia scroll mode after the input of the release coordinates.

New games can be provided by installing the card reader and touch panel in the game apparatus like the structure motioned above. Besides, in case of the game which reads card data from the card set on the card reader and displays images on the display screen on the touch panel on the basis of the card data, like the structure mentioned above, the user tends to perform mis-operation because the user has to operate both the card and the touch panel. Therefore preventing from scrolling of the screen by user's mistake by the scrolling control of the scrolling screen apparatus mentioned above is preferable. New games which are easy to operate for users can be provided by the game apparatus mentioned above.

Advantageous Effects of the Invention

A scrolling screen apparatus, a method for scrolling screen, and a game apparatus which prevent from scrolling of the display screen by mis-operation and scroll the display screen by intuitive operation can be provided, because the present invention scrolls the display screen by the amount of displacement corresponding to the sliding distance of the user's finger on the touch panel, when the inertia like scrolling control is performed after the termination of the input to the coordinate input device.

Embodiments for carrying out the present invention is explained with the figures as follows. However the present invention is not restricted within the following embodiments, and involves proper arrangements of the following embodiments by a skilled person.

(1. Scrolling Screen Apparatus)

Figure 1:
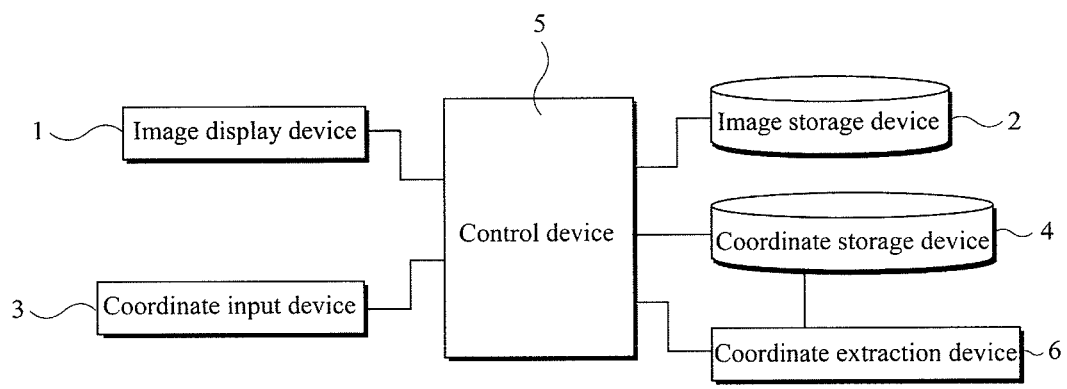
FIG. 1 is a block diagram that shows functional structure of the scrolling screen apparatus of the present invention.

At first, the basic structure of the scrolling screen apparatus of the present invention is explained. FIG. 1 is a block diagram that shows basic functional structures of the scrolling screen apparatus of the present invention. The scrolling screen apparatus 10 of the present invention comprises an image display device 1, an image storage device 2, a coordinate input device 3, a coordinate storage device 4, control device 5 and a coordinate extraction device 6 as shown in FIG. 1.

The image display device 1 has a function displaying images. For example, the image display device 1 may be a liquid-crystal display or an organic electroluminescence display. Especially, it is preferable that the scrolling screen apparatus 10 comprises the image display device 1 having large screen. For example, it is preferable that the display size of the image display device 1 is 10 to 75 inch, 16 to 40 inch or 20 to 38 inch.

The image storage device 2 has a function storing image data to display in the image display device 1. The image storage device 2 can be realized by a storage device such as ROM (Read Only Memory) and RAM (Random Access Memory). VRAM, (Video RAM), DRAM(Dynamic RAM) or SRAM(Static RAM), etc. may be used as RAM, and it may be selected in accordance with the use of the object applying the scrolling screen apparatus. For example, the image storage device 2 stores the image data of a game space. The game space means the world in the game, it also called "World". The data about the game space involves positional information, type information and image data of the objects to be displayed. Examples of the objects to be displayed are background, buildings, landscape, plants and characters appearing in the game. It is preferable that the image data are stored as polygon data. The polygon data includes, for example, vertex coordinate data, texture data, color data and transparency data. Further, the image storage device 2 may store image data about a map displayed in the image display device 1. Examples of the data about the map are terrain, place names, orientation and scale.

The coordinate input device 3 has a function obtaining the coordinate data on the screen of the image display device 1. An example of the coordinate input device 3 is a touch screen located in front of the image display device 1. The touch screen can obtain the coordinate data by detecting touch by the user's finger by well-known methods using such as captive sensing, electromagnetic induction, infrared and resistive layers. It is preferable that the coordinate input device 3 composed the touch panel with the image display device 1. In this case, the coordinate input device 3 can obtain the coordinate data of the point touched by the user. Further, the coordinate input device 3 may be a pointing device such as a mouse and a tablet.

The coordinate input device 3 can obtain the input coordinates at predetermined time intervals. For example, it is preferable that the coordinate input device 3 obtains the input coordinates in accordance with the frame displayed in the image display device 1. The coordinate input device 3 may obtain the input coordinates per 1 frame, or per 2 to 10 frames. For example, when 1 frame is 60 fps, it is preferable that the coordinate input device 3 obtains the input coordinates per 1/60 second.

The coordinate storage device 4 has a function storing the coordinate data obtained by the coordinate input device 3. For example, the coordinate storage device 4 is realized by a work area of the RAM. When the coordinate input device 3 obtains coordinates continuously in a certain period of time, the coordinate storage device 4 stores the first input coordinates as a touch coordinates. Furthermore, when coordinates are obtained continuously after the obtaining of the touch coordinates to the coordinates input device, the coordinates that continuously obtained are stored as sampling coordinates. Besides, if coordinates are no longer input after the continuous obtaining by the coordinate input device 3 in a certain period of time, the coordinate storage device 4 stores the coordinates just before the termination of inputting as a release coordinates. The touch coordinates, the plurality of sampling coordinates and the release coordinates are stores in temporal order in the coordinate storage device 4 and the order is preserved.

The control device 5 has a function controlling the display screen of the image display device 1. For example, the control device 5 is functionally accomplished by CPU (Central Processing Unit) or GPU (Graphics Processing Unit). The control device 5 reads image data from the image storage device 2, and then makes the image display device 1 display the image. Furthermore, the control device 5 can scroll the display screen of the image display device 1 by performing control of writing/reading to the image storage device 2 on the basis of data of each input coordinate (the touch coordinates, the sampling coordinates and release coordinates) stored in the coordinate storage device 4. The image display device 1 displays the image corresponding to the image data read from the image storage device 2. Namely, in the displacement scroll mode between the input of the touch coordinates and the input of the release coordinates to the coordinate input device 3, the control device 5 calculates the displacement vector of each input coordinate and scrolls the display screen by the amount of displacement corresponding to the displacement vector. Meanwhile, in the inertia scroll mode after the input of the release coordinates, the control device 5 calculates the scroll distance, which is the total sum of the distances between the touch coordinates, each sampling coordinate and the release coordinates read from the coordinate storage device 4, and scrolls the display screen by the amount of displacement corresponding to the scroll distance. Specific processes in the control device 5 will be mentioned later.

The coordinate extraction device 6 has a function extracting coordinate data from the coordinate storage device 4. The coordinate extraction device 6 may be a part of the function of the control device 5. Specifically, the coordinate extraction device 6 extracts the plurality of sampling coordinates, which are input to the coordinate input device 3 within a predetermined period of time just before input of the release coordinates to the coordinate input device 3, from the coordinate storage device 4. Examples of the predetermined period of time are 0.5 to 2 seconds and 1 to 1.5 seconds. The coordinate data extracted by the coordinate extraction device 6 temporarily stored in the coordinate storage device 4. The coordinate data extracted by the coordinate extraction device 6 are read by the control device 5, and predetermined calculation is performed during the control in the inertia scroll mode.

Figure 2:
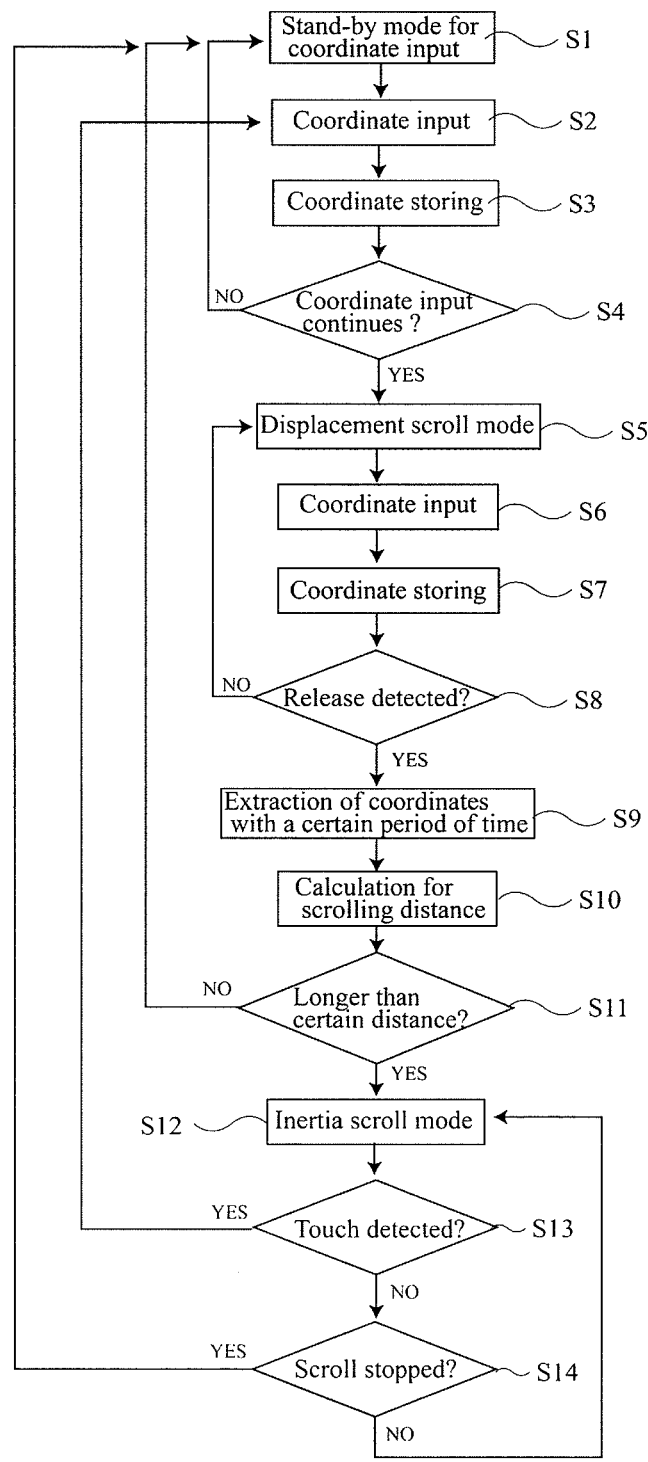
FIG. 2 is a flow diagram that shows processes of the method for scrolling screen executed by the scrolling screen apparatus.

Next, the flow of the scrolling screen method executed by the scrolling screen apparatus 10 is explained by using FIG. 2. A state without input of coordinate data to the coordinate input device 3 is a stand-by mode for coordinate input as shown in FIG. 2 (Step S1). In this stand-by mode, the control device 5 does not perform control of scrolling of the display screen.

Then, when coordinate data is input by touching the coordinate input device 3, the coordinate input device 3 obtains the coordinate data (Step S2). First coordinate data input to the coordinate input device 3 stores in the coordinate storage device 4 as a touch coordinate (Step S3).

Furthermore, in case that coordinates inputting is performed continuously, these coordinate data are obtained continuously on the sampling points at predetermined time intervals and stored in the coordinate storage device 4. The control device 5 detects whether the input of coordinates to the coordinate input device 3 is kept on or not (Step S4). The control device 5 performs control in the displacement scroll mode, in case that the control device 5 detects continuous input of coordinates (Step S5). Meanwhile, the control device 5 returns to the stand-by mode, in case that the control device 5 does not detect continuous input of coordinates (Step S1). The control device 5 may perform other operation control related to the touch coordinates on the basis of the input touch coordinates without performing control of scrolling of the display screen, in case that the it does not detect continuous input of coordinates.

The control device 5 performs control in the displacement scroll mode, in case that the control device 5 detects continuous input of coordinates (Step S5). In the displacement scroll mode, the control device 5 obtains coordinate data input continuously (Step S6) and stores each coordinate data to the coordinate storage device 4 as sampling coordinates (Step S7). Further, on the basis of the displacement vector of input coordinate obtained by the coordinate storage device 4, the control device 5 scrolls the display screen by the amount of the displacement equal or proportional to the displacement vector. Then the control device 5 detects whether the touch operation to the coordinate input device 3 is released or not on the basis of the existence of coordinate input to the coordinate input device 3 (Step S8). Namely in case that the control device 5 detects continuous coordinate input to the coordinate input device 3 without detecting release of operation, the control device 5 returns to Step S5 and scrolls continuously the display screen by the amount of the displacement corresponding to the displacement vector of input coordinate obtained by the coordinate storage device 4. Meanwhile the control device 5 terminates the operation in the displacement scroll mode, in case that the control device 5 detects release of operation and termination of coordinate input to the coordinate input device 3. In this situation the control device 5 stores the input coordinates just before the detection of the release of operation to the coordinate storage device 4 as a release coordinates.

The control device 5 extracts the coordinate data, which is input to the coordinate input device 3 within a predetermined period of time before the detection of the release of operation, by the coordinate extraction device 6, in case that the control device 5 detects the termination of coordinate input to the coordinate input device 3 after the displacement scroll mode (Step S9). Namely the touch coordinates, the plurality of sampling coordinates and the release coordinates which are obtained by the coordinate input device 3 in the displacement scroll mode are stored in the coordinate storage device 4 without losing its temporal order. Therefore the coordinate extraction device 6 can extract each coordinate input to the coordinate input device 3 (the touch coordinates, the sampling coordinates and the release coordinates) within a predetermined period of time (e.g. 1 second) before the release coordinate input by referring to the coordinate storage device 4. For example, the coordinate extraction device 6 may extract all the coordinates from the touch coordinates to the release coordinates, in case that all the coordinates from the touch coordinates to the release coordinates were input to the coordinate input device 3 within a predetermined period of time before the input of the release coordinate. Besides, for example in case that the touch coordinates and some sampling coordinates were not input within a predetermined period of time before the input of the release coordinate, the coordinate extraction device 6 may extract only other sampling coordinates which were input within the predetermined period of time and the release coordinates. Each coordinate data extracted by the coordinate extraction device 6 is stored temporarily in the coordinate storage device 4.

Then the control device 5 calculates the scroll distance from the coordinate data extracted by the coordinate extraction device 6 (Step S10). The scroll distance is the sum total of the distances between the touch coordinates, each sampling coordinate and the release coordinates which were input to the coordinate input device 3 within a predetermined period of time before the input of the release coordinates. Especially, the scroll distance means the sum total of the distances between adjoining points in temporal order of inputting.

Figure 3:
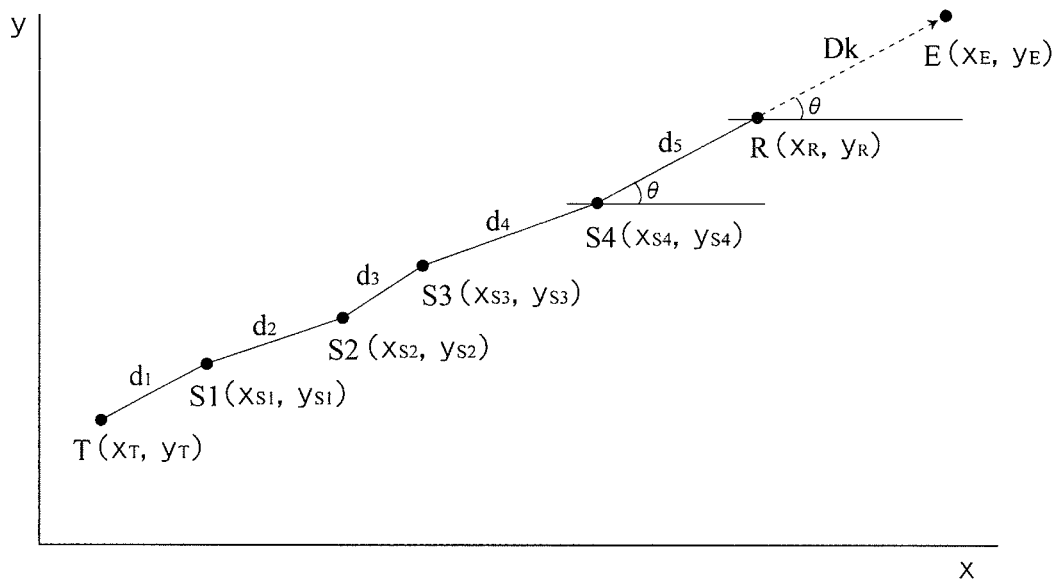
FIG. 3 shows an example of scrolling control of the scrolling screen apparatus.

Next, an example of calculation of the scroll distance is explained with FIG. 3. FIG. 3 shows an example which is input the touch coordinates T, the sampling coordinates S1 to S4 and the release coordinates R within a predetermined period of time before input of the release coordinates. After input of the touch coordinate T, the sampling coordinates S1 to S4 and the release coordinates R are obtained on the sampling points that are set per a predetermined period of time ($\Delta t$) in FIG. 3. In FIG. 3, ($x_T$, $y_T$) represents the touch coordinate T which is the first input to the coordinate input device 3, ($x_R$, $y_R$) represents release coordinate R which is input just before the termination of coordinate input to the coordinate input device 3 and ($x_{S1}$, $y_{S1}$) to ($x_{S4}$, $y_{S4}$) repesent the sampling coordinates S1 to S4 which are input on each sampling point between the input of the touch coordinate T and the input of release coordinate R.

As shown in FIG. 3, $d_1$ represents the linear distance between the touch coordinate T and first sampling coordinates $S_1$, $d_2$ represents the linear distance between the first the sampling coordinates $S_1$ and second sampling coordinates $S_2$, $d_3$ represents the linear distance between the second sampling coordinates $S_1$ and third sampling coordinates $S_2$, $d_4$ represents the linear distance between the third sampling coordinates $S_1$ and fourth sampling coordinates $S_2$, $d_5$ represents the linear distance between the fourth sampling coordinates $S_1$ and release coordinate R, respectively.

The distances d1 to $d_5$ can be obtained from the following equations respectively.

$$d_1 = \sqrt{(x_{S1}-x_T)^2+(y_{S1}-y_T)^2}$$
$$d_2 = \sqrt{(x_{S2}-x_{S1})^2+(y_{S2}-y_{S1})^2}$$
$$d_3 = \sqrt{(x_{S3}-x_{S2})^2+(y_{S3}-y_{S2})^2}$$
$$d_4 = \sqrt{(x_{S4}-x_{S3})^2+(y_{S4}-y_{S3})^2}$$
$$d_5 = \sqrt{(x_{S4}-x_R)^2+(y_{S4}-y_R)^2} \qquad \text{Equation 1}$$

As mentioned above, the control device 5 reads each coordinate from the coordinate storage device 4, and the control device 5 can calculate the distances $d_1$ to $d_5$, which are the distances between adjoining points in temporal order of inputting. Further the control device 5 can calculate the scroll distance D from the sum total of the Distances $d_1$ to $d_5$. For example the scroll distance D is temporarily stored in the work area of the image storage device 2.

After the calculation of the scroll distance, it is preferable that the control device 5 distinguishes whether the scroll distance is longer than a certain distance or not. For example, the certain distance may be set properly considering the size of the display, etc. Examples of the certain distance may be 10 mm, 20 mm, 50 mm or 100 mm. If the scroll distance is longer than the certain distance, the control device 5 changes its control way into the one in the inertia scroll mode. Meanwhile, if the scroll distance is shorter than the certain distance, the control device 5 stops scrolling of the display screen of the image display device 1 and then returns to stand-by mode (Step S1). Namely, if a scroll distance which are shorter than the certain distance is input, the control device 5 does not handle the input as an operation intended to scroll the display screen and stops scrolling of the display screen. Therefore the scrolling screen apparatus of the present invention effectively prevents from scrolling of the display screen by mis-operation.

The control device 5 scrolls the display screen of the image display device 1 by the amount of the displacement proportional to the scrolling distance mentioned above in the inertia scroll mode. In this situation, it is preferable that the control device 5 reads the release coordinates and the last sampling coordinates, which was last input before the release coordinates, and scrolls the display screen toward the direction of the extension line connecting the sampling coordinates and the release coordinates. It is also preferable that the control device 5 gradually decreases the scroll speed of the display screen until the amount of displacement corresponding to the scroll distance in the inertia scroll mode. Namely, in the inertia scroll mode, the amount of scrolling is gradually decreased by setting an amount of decrease as if there is friction, and then stops scrolling of the display screen at the point in time when the amount of scrolling becomes 0.

The control device 5 also detects operation state of the coordinate input device 3 from the existence of the input coordinates to the coordinate input device 3 in the inertia scroll mode (Step S13). If the control device 5 detects data input to the coordinate input device 3 during control in the inertia scroll mode, the control device 5 stops scrolling and returns to the processing of Step S2, and then obtains the input coordinates (Step S2) and stores the coordinate data (Step S3). Meanwhile the control device 5 stops scrolling of the display screen when the scrolling amount of the display screen reaches the amount of the displacement corresponding to the scrolling distance (Step S14). The control device 5 scrolls the display screen continuously (Step S12) and performs detection of the existence of the input coordinates to the coordinate input device 3 repeatedly, in the state that the display screen is kept on scrolling (Step 13). When the control device 5 detects a termination of the scrolling of the display screen, it returns to Step S1 again and waits for coordinate inputs (Step S1).

The control in the inertia scroll mode is explained specifically with FIG. 3. As shown in FIG. 3, the release coordinates R input just before the termination of the coordinate input to the coordinate input device 3 is represented by $(x_R, y_R)$ and the forth sampling coordinates obtained on the last sampling point before the release coordinate R is represented by $(x_{S4}, y_{S4})$. Assuming the constant of proportionality is k, the distance of scrolling of the display screen is expressed by Dk, because the control device 5 scrolls the display screen by the amount of the displacement (distance) proportional to the scroll distance D as mentioned above. Further, the control device 5 scrolls the display screen toward the direction of the extension line connecting the forth-sampling coordinates S4 and the release coordinates R. Accordingly, when the angle of the line connecting the forth-sampling coordinates S4 and the release coordinates R to the x-axis is represented by θ, the angle of the extension line to scroll the display screen to the x-axis is also expressed by θ.

Therefore, scrx which is the amount of scrolling in the x-axis direction R and scry which is the amount of scrolling in the y-axis direction from the release coordinates are represented by the following equation.

$$scrx = Dk \times \cos\theta$$

$$scry = Dk \times \sin\theta$$

Further, the coordinates of the end point E is represented by $(x_E, y_E)$ that is the point, which is away by the scroll distance Dk from the release coordinates R.

The x coordinate $x_E$ and y coordinate $y_E$ of the end point are represented by the following equations.

$$x_E = x_R + scrx$$

$$y_E = y_R + scry$$

The control device 5 can calculate scrx which is the amount of scrolling in the x-axis direction and scry which is the amount of scrolling in the y-axis direction by the calculation mentioned above, and perform inertial scrolling of the display screen. The inertial scrolling of the display screen stops on the coordinates of the end point $E(x_E, y_E)$ that is the point, which is away by the scroll distance Dk from the release coordinates R. Besides, the amount of scrolling may be gradually decreased by setting an amount of decrease so as to stop scrolling on the end point $E(x_E, y_E)$. The amount of scrolling is optional element, so it is variable according to the situation. Further scrolling may be performed at constant speed without setting the amount of decrease.

For example, the scrolling screen apparatus 10 which has the structure mentioned above can be applied to game apparatuses, car navigation apparatuses and computers. The scrolling screen apparatus 10 can realize the scrolling operation corresponding to the sliding track of the user's finger in the displacement scroll mode while the user slides his finger on the touch panel, and the scrolling operation corresponding to the sliding distance of user's finger in the inertia scroll mode after the detachment of user's finger.

Figure 4:
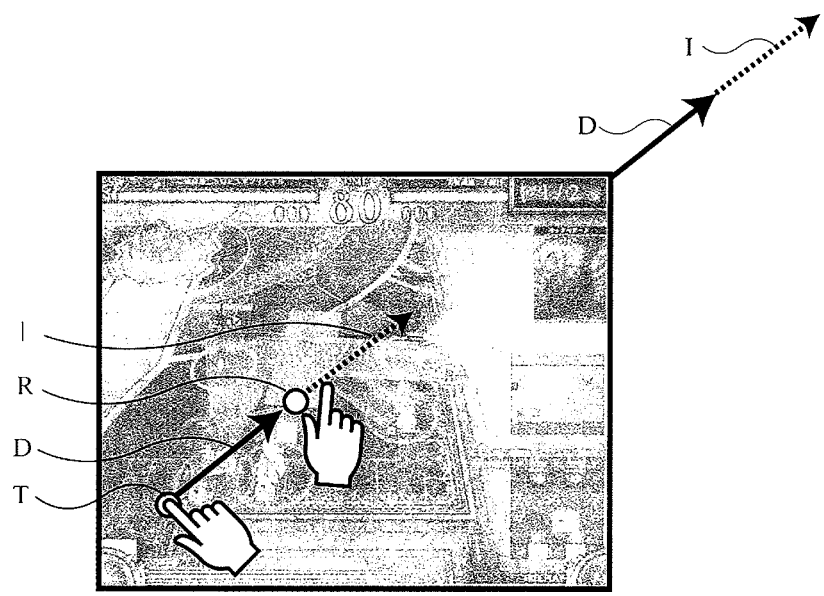
FIG. 4 shows an example of operation of the scrolling screen apparatus.
Figure 5:
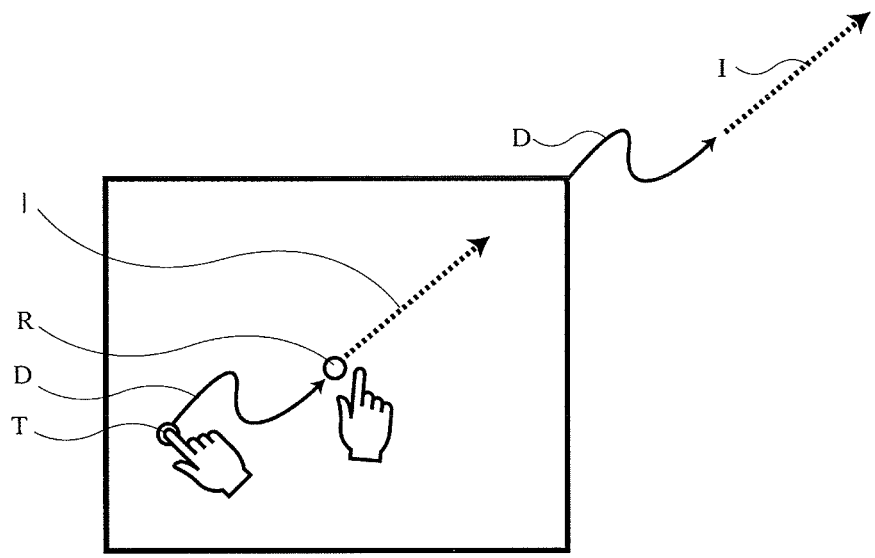
FIG. 5 shows an example of operation of the scrolling screen apparatus.
Figure 5:
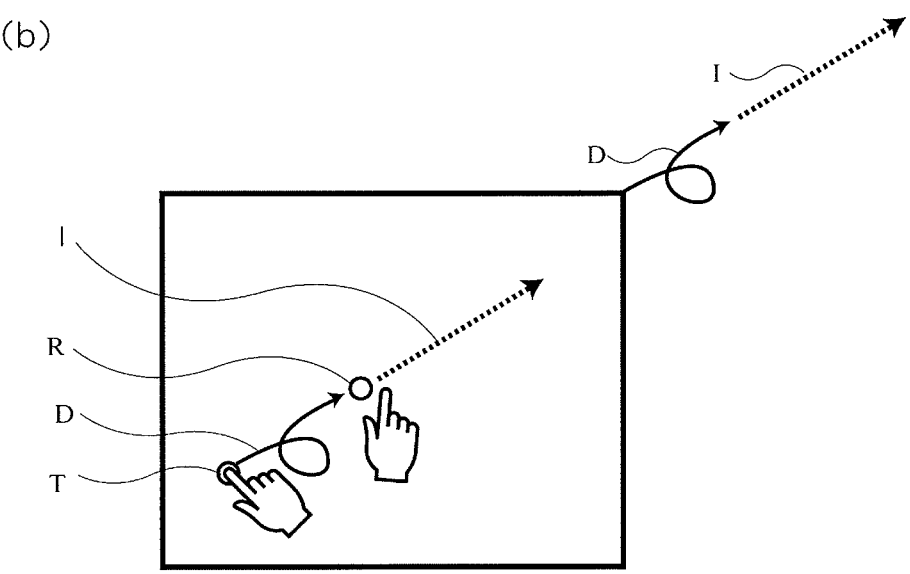
Figure 6:
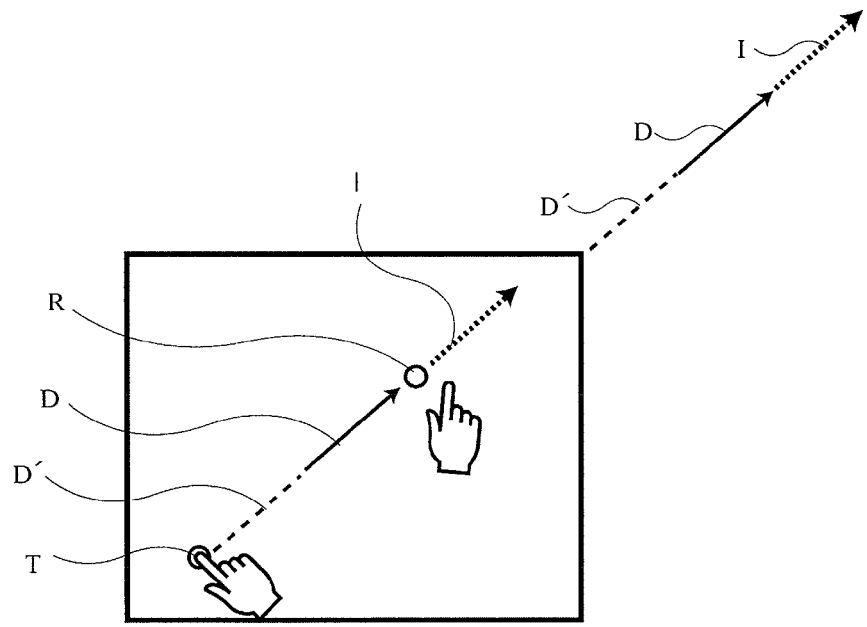
FIG. 6 shows an example of operation of the scrolling screen apparatus.

Next, examples of the scrolling screen apparatus 10 of the present invention are explained with FIGS. 4 to 6.

FIG. 4 shows an example of basic operation of the scrolling screen apparatus 10.

For example, if a user touches a point on the display of the touch panel 3, the control device 5 recognizes the point as touch coordinates T. Then, if the user still keeps on touching, the control device 5 obtains each input coordinate as sampling coordinates. If a user touches a point on the display of the touch panel 3, the control device 5 scrolls the display screen by the amount of displacement corresponding to the displacement vector of each input coordinate. Then if the user's finger is detached from the display, the point is recognized as release coordinate R. The control device 5 calculates a scroll distance D from data of the touch coordinates T, each sampling coordinate and the release coordinates R. Further, the control device 5 scrolls the display screen by a inertia scroll distance I (I=Dk), proportional to the scroll distance D, from the release point.

FIG. 5 shows another example of operation of the scrolling screen apparatus.

FIG. 5(a) shows an example of touching with a winding track. In this example, the control device 5 obtains the input coordinates on the each coordinates as sampling coordinates and scrolls the display screen by the amount of displacement corresponding to the displacement vector of each input coordinate during the continuous touch operation. Namely, if the track of the user's touching winds its way, the control device 5 scrolls the display screen corresponding to the winding track during the continuous touch operation. Meanwhile, if the user's touching is released, the control device 5 scrolls the display screen by the inertia scroll distance I proportional to the scroll distance D. Therefore, in case that the user slides his finger with a winding track on the touch panel 3, even if the linear distance between the touch coordinates T and the release coordinates R is short, the inertia scroll distance I naturally becomes longer because the scroll distance D is long.

FIG. 5(b) shows an example of touching with a circular track. As shown in FIG. 5(b), in case that the user touches the touch panel with a circular track, the liner distance between the touch coordinates T and the release coordinates R is short, nevertheless the scroll distance D becomes longer corresponding to the number of times that the users draws a circle. So the inertia scroll distance I naturally becomes longer corresponding to the scroll distance D Namely, the method of scrolling long distances on the display screen is not only lengthening of the liner distance between the touch coordinates and release coordinates but also sliding a finger on the display screen with winding or circular track. The operation of scrolling long distances on the display screen by sliding a finger on the display screen with winding or circular track is a new operation method proposed by the present invention. This operation method is similar to the physical phenomenon, such as throwing an object away by using centrifugal force, so intuitive and new operation can be provided.

FIG. 6 shows another example of operation of the scrolling screen apparatus.

The example of FIG. 6 is the case when the user continues to touch the touch panel over a certain period of time. As mentioned above, the control device 5 extracts the coordinate data input to the touch panel within a certain period of time t before the detection of release operation through the coordinate extraction device 6, and calculates the scroll distance D, in case that the control device 5 detects the termination of coordinate input to the coordinate input device 3 after the displacement scroll mode. The scroll distance within the certain period of time t before the detection of releasing is represented by D, and the scroll distance at a point in time earlier than the certain period of time t is represented by D'. The control device 5 scrolls the display screen along the sliding movement of the user's finger on the touch panel 3 in the displacement scroll mode as usual. Meanwhile, if the user's touching is released, the control device 5 calculates a scroll distance D from the sampling coordinates that are input within the certain period of time t. Then the control device 5 scrolls the display screen corresponding to the inertia scroll distance I proportional only to the scroll distance D. Namely the scroll distance D' on the basis of the sampling coordinates that is input earlier than the certain period of time t, is not used in the calculation for the inertia scroll distance I.

Therefore the scrolling operation which reflects user's intention properly is realized by restricting of the scrolling distance to reflect in the inertia scroll distance 1 to the distance just before the detection of releasing.

For example, the scrolling screen apparatus mentioned above can be applied to game apparatuses or car navigation apparatuses. In case of application of the scrolling screen apparatus to game apparatuses, the control device may scroll the point of view in the game space on the basis of the coordinate data input to the coordinate input device. In case of application of the scrolling screen apparatus to car navigation apparatuses, the control device may scroll the map image.

A game apparatus equipped with the scrolling screen apparatus is explained as one of the embodiments of the present invention in the following section.

(2. Game Apparatus)

[An Example of the Game Apparatus]

Figure 7:
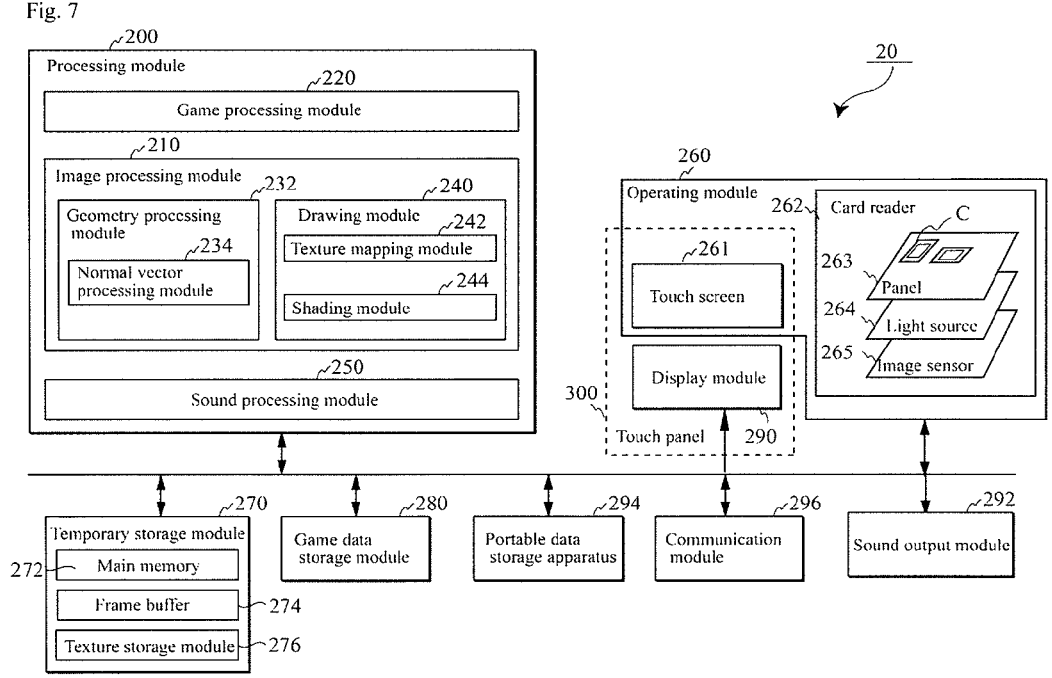
FIG. 7 is a block diagram that shows the structure of the game apparatus of the present invention.
Figure 8:
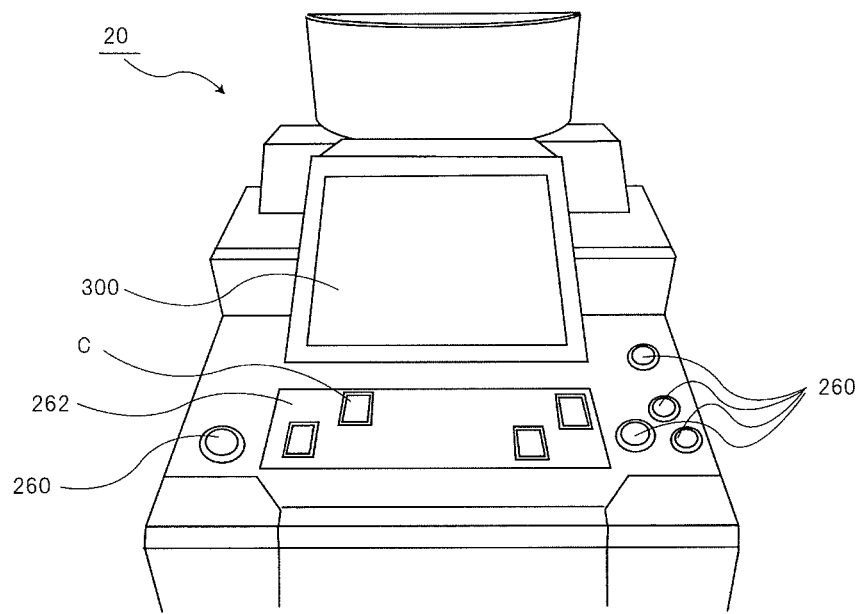
FIG. 8 shows a perspective view of the casing of the game apparatus of the present invention.

FIG. 7 is a block diagram that shows the structure of the game apparatus of the present invention. The embodiment shown in this block diagram is especially suitable for arcade type game apparatus for business use. FIG. 8 shows a perspective view of the casing of the game apparatus of the embodiment of the present invention.

The processing module 200 performs various processing such as controlling of the entire system, ordering to each block in the system, game processing, image processing and sound processing as shown in FIG. 7. The function of the processing module 200 is realized by various processors (e.g. CPU, DSP), hardware such as ASIC (e.g. gate array) or given programs (e.g. game program).

The operating module 260 is for inputting of operation data by a player. For example, the function of the operating module 260 is realized by a card reader, a touch panel, levers, buttons, a frame, a controller having hardware. The processing data from the operating module 260 is sent to main processor, etc. through a serial interface (I/F) or a bus. It is preferable that the game apparatus 20 comprises a touch screen 261 and a card reader 262 and proceeds with the game corresponding to the input data from them.

The touch screen 261 can detect a touch by user's finger by well-known methods using such as captive sensing, electromagnetic induction, infrared and resistive layers, and obtain the coordinate data. The touch screen 261 is formed by transparent material and composes the touch panel 300 with the display module 290. The touch screen 261 obtains the coordinate data on the display module 290 because the positional relationship between the touch screen 261 and the display module 290 links each other. Therefore the touch screen 261 can detect the touch by user's finger and obtain the coordinate data on the display module 290 touched by user's finger. The coordinate data obtained by the touch screen 261 is stored in a temporary storage module 270.

The card reader 262 is an apparatus to obtain the unique card data of the card C by reading an identification cord, when the card C is set on. For example, a character illustration is printed on the surface of the card C, and the identification cord is recorded on the back surface to identify the character. For example, the identification cord is printed on the back surface by ink that cannot be seen by visible light, and the pattern printed in black and white is appeared by a certain invisible light. For example, the identification cord is printed by ink such as special ink that absorbs invisible light (infrared, etc.), so the invisible light irradiated to the part of the identification cord except for the black part is reflected.

The card reader 262 can take an image of the identification cord recorded in the card C. For example, the card reader 262 has a panel 263 on its top and the card C is set on the panel 263. Furthermore, for example, a light source 264 to irradiate the back of the card set on the panel 263 with infrared (invisible light), and an image sensor 265 to take an image of the pattern of the card data recorded in the card C by obtaining the infrared reflected from the back of the card C set on the panel 263. An example of the light source 264 is light emitting diodes (LED) emitting invisible light, such as infrared and ultraviolet rays. The image sensor 265 takes an image from the infrared, which is reflected from the back of the card C and enters into the card reader 262. Furthermore the card reader 262 analyses this identification cord and obtains the unique card data of the card C. Then the card data is sent to the processing module 200 and stored in the temporary storage module 270.

For example, at least the identification number of the character illustrated on the card and the card direction are recorded in the identification cord of the card C. Therefore the processing module 200 can recognize the character type, name, property and characteristics in accordance with the direction of the card, which are recorded in the card C by making reference to the character table stored in the temporary storage module 270 on the basis of the card data obtained from the card reader 262.

The temporary storage module 270 is a work area for the processing module 200 and the communication module 296. Programs or various tables may be also installed in the temporary storage module 270. Further, for example, the temporary storage module 270 may comprise a main memory 272, a frame buffer 274 and a texture storage module 276, and store various tables. The function of the temporary storage module 270 is realized by hardware such as RAM. Examples of RAM are VRAM, DRAM and SRAM, and it may be selected in accordance with the use. The VRAM, etc. composing the frame buffer 274 is used as a work area for the various processors. The operation data input to the operating module 260 by the user stored in the temporary storage module 270. Especially, the touch screen 263 obtains input coordinates per frame displayed in the display module 290 and stores each coordinate data to the temporary storage module 270.

A game data storage module 280 stores game programs and image data to display in the display module 290. An example of the game data storage module 280 is ROM, so it is realized by non-volatile memories such as optical discs (CD, DVD), magneto-optical disks (MO), magnetic disks, hard disks and magnetic tapes. The processing module 200 performs various processing on the basis of the data stored in the game data storage module 280. The game data storage module 280 stores the data (programs and data) to execute the method of the present invention (especially the block included in the processing module 200). For example, the entire or a part of the data stored in the game data storage module 280 is written into the temporary storage module 270 at power-on.

The data including at least two of program code to perform a certain processing, image data, sound data, shape data of the objects to be displayed, table data, list data, data to order the processing of the present invention and data to process according to the order is stored in the game data storage module 280. For example, this table data includes the data of the character table that stores the character type, name, property and characteristics in accordance with the direction of the card, with relevance to the identification number of the game character. Further, it is preferable that the game data storage module 280 is also used as a data storage storing the data about the game space. The game space means the world in the game of the game apparatus of the present invention, it also called "World". The data about the game space includes the positional data, the type and the image data of the objects to be displayed. Examples of the objects to be displayed are background, buildings, landscape, plants and characters appearing in the game. It is preferable that the image data is stored as polygon data. The polygon data includes, for example, vertex coordinate data, texture data, color data and transparency data. The game data storage module 280 classifies and stores the objects to be displayed according to the direction of the point of view of the player character, position and area.

The display module 290 has a function displaying images generated by the present embodiment. The function of the display module 290 is realized by hardware such as CRT (cathode lay tube), LCD (liquid crystal display), OEL (organic electroluminescence) and PDP (plasma display panel). The touch screen 261 is equipped on the back of the display module 290. The touch screen 261 and the display module 290 compose the touch panel 300.

The sound output module 292 outputs sound. The function of the sound output module 292 can be realized by hardware such as speakers. For example, sound processing is performed by the sound processor connected with a main processor through a bus, then the sound is output.

The portable data storage apparatus 294 stores data such as individual data and save data. Examples of the portable data storage apparatus 294 are memory cards and portable game apparatuses. The function of the portable data storage apparatus 294 can be realized by well-known devices such as memory cards, flash memory, hard disks and USB flash disks. However the portable data storage apparatus 294 is not essential structure, so it is installed in case of necessity to distinguish individuality of the player.

The communication module 296 is an optional structure to perform various controls for communication with the outside (e.g. host servers and other game apparatuses). Match play and corporative play can be realized by connecting the game apparatus 10 with the host servers and other game apparatuses through the communication module 296. The function of the communication module 296 can be realized by hardware, such as various processors and ASIC for communication use, and programs. Further the program or data to execute the game apparatus 20 may be delivered through a network and the communication module 296 from the storage medium of the host apparatus (the server).

The processing module 200 may comprise a game processing module 220, an image processing module 230 and a sound processing module 250. Specifically, examples of the processing module 200 are main processors, co-processors, geometry processors, graphical processors, data processing processors, arithmetic circuits and all-purpose arithmetic circuits. These structures are connected with a bus, etc., so they can transfer signals each other. Further, the processing module 200 may comprise a data extension processor to extend compressed data.

The game processing module 220 performs various processing, such as scroll processing of the point of view (the position of the virtual camera) on the display module 290 and the angle of view (the rotation angle of the virtual camera), processing to display the character on the display module 290 on the basis of the card data obtained by the card reader 262, accepting coins (as the price), setting for each mode, processing of game procession, setting for selection screens, calculation for the position and rotation angle (the rotation angle to x, y or z axis) of the character, motion processing for objects, positioning processing for objects (e.g. map objects) in the object space, hit checking, calculation of the result of the game (e.g. game scores), processing for corporative play by a plurality of players in the same game space and processing when the game is over, on the basis of the operation data from the operating module 260, individual data, save data or game program from the portable data storage apparatus 294.

The image processing module 230 performs various image processing by the order from the game processing module 220, etc. The game processing module 220 reads the image data of the game space from the game data storage module 280 on the basis of the information about the position of the point of view and viewing angle, and writes the image data into the temporary storage module 270. The game processing module 220 provides the image processing module 230 with the scroll data to move the point of view. The image processing module 230 reads image data per frame from the temporary storage module 270 on the basis of given scroll data, and displays the image in the display module 290 on the basis of the image data. The game space on the basis of the point of view is displayed in the display module 290 by these processes. The image processing module 230 also moves the point of view in the game space corresponding to the input coordinates to the touch screen 261. Then the image processing module 230 reads a frame from the temporary storage module 270 according to the data of the moving point of view, and displays the images in the display module 290. In this way, the display screen transits by scrolling of the point of view in the game space. Specifically, the image processing module 230 controls scrolling in the displacement scroll mode and inertia scroll mode on scrolling the point of view in the game space. Namely the image processing module 230 scrolls by the amount of the displacement corresponding to the displacement vector of each input coordinate, and displays the game space in the display module 290 according to the point of view in the displacement scroll mode. The image processing module 230 also scrolls the point of view by the amount of the displacement corresponding to the scroll distance which is the sum total of the distances between the touch coordinates, each sampling coordinate and the release coordinates read from the temporary storage module 270, and displays the game space in the image display device 1 according to the point of view in the inertia scroll mode.

The image processing module 230 also reads the card data, which is obtained by the card reader 262, from the temporary storage module 270, and refers to the character table according to the card data. Then the image processing module 230 reads the character data related to the card data from the temporary storage module 270 or game data storage module 280 according to the link information stored in the character table. Then the image processing module 230 generates the character in the game space according to the character data, and displays the character in the display module 290. The game processing module 220 controls behavior of the characters in the game space according to the coordinate data input to the touch screen 261 or the operation data from other operating modules (e.g. levers, buttons or controllers).

For example, the game processing module 220 distinguished whether the character is touched or not, by making reference to the coordinate data of the character displayed in the display module 290 according to the card data from the card reader and the coordinate data input to the touch screen 261 by the user. Namely, the game processing module 220 recognizes that the character is selected, when the coordinate data input to the touch screen 261 agrees with the positional data of the character. If a different coordinate data is input to the touch screen 261 again after the input of the coordinate data agrees with the positional data of the character, the game processing module 220 moves the selected character according to the coordinate data which is input again. It is preferable that the game apparatus 20 proceeds with the game by making a link between the card data obtained by card reader 262 and the coordinate data which is input to the touch screen 261.

The sound processing module 250 emits various sound according to the order from the game processing module 220.

All the functions of the game processing module 220, image processing module 230 and sound processing module 250 may be realized only by hardware or software. Further all the functions may be also realized by both hardware and software.

For example, the image processing module 230 comprises a geometry processing module 232 and a drawing module 240.

The geometry processing module 232 performs various calculation such as coordinate transformation, clipping, perspective transformation and lighting calculation. For example the object data (e.g. vertex coordinate data, vertex texture data and brightness) after the geometry processing (perspective transformation) is stored and saved in the main memory 272.

The drawing module 240 draws the objects in the frame buffer 274 according to the object data after the geometry processing (perspective transformation) and texture stored in the texture storage module 276, and so on.

For example, the drawing module 240 comprises a texture mapping module 242 and a shading module 244. Specifically, the drawing module 240 is realized by a drawing processor. The drawing processor is connected with texture storages, various tables, frame buffers, VRAM, etc., and furthermore, it is connected with a display.

The texture mapping module 242 reads environmental texture from the texture storage module 276 and performs mapping of the environmental texture for the object.

The shading module 244 performs shading processing for the objects. For example, the geometry processing module 232 performs lighting calculation for the brightness of each vertex (RGB) from the information of the light source for shading, lighting model and normal vector of each vertex (RGB) of the objects. The shading module 244 calculates the brightness of each dot on the primitive surface (polygon, curved surface), from the brightness of each vertex by such as phong shading and gouraud shading.

For example, the geometry processing module 232 comprises a normal vector processing module 234. The normal vector processing module 234 may perform rotating processing of the normal vector of each vertex of the object (the normal vector of the surface of the object in a broad sense), according to the rotation matrix from the local coordinate system to the world coordinate system.

[Basic Operation of the Game Apparatus]

For example, the entire of a part of the data to store in the game data storage module 280 sends to the temporary storage module 270 when the power of the system comes on. Then a program for game processing is loaded in the main memory 272, and various data is stored in the texture storage module 276, tables, which are not in the figures and so on.

The various operation data from the operating module 260 are sent to the processing module 200 through a serial interface or a bus, which are not illustrated in the figures, and various image processing and sound processing are performed. The sound data processed by the sound processing module 250 is sent to the sound output module 292 through a bus, and the sound data is output as sound. Save data stored in the portable data storage apparatus 294 are sent to the processing module 200 through a serial interface or a bus, which are not illustrated in the figures, and then certain data are written in the temporary storage module 270.

The image processing module 230 performs various image processing according to the order from the game processing module 220 and so on. For example, the image processing module 230 moves a point of view in the game space corresponding to input coordinates to the touch screen 261. Then, the image processing module 230 reads a frame from the temporary storage module 270, and displays the image in the display module 290. Furthermore, the drawing module 240 generates a character on the basis of the card data obtained by the card reader 262, and displays the character in the display module 290.

Specifically, the geometry processing module 232 performs various geometry calculation (three dimensional coordinates calculation) such as coordinate transformation, clipping, perspective transformation and lighting calculation, and generates images of the game space and character on a certain point of view. For example, the object data such as the vertex coordinates, vertex texture data and brightness of the object after geometry processing (perspective transformation) is stored and saved in the main memory 272 of the temporary storage module 270. Then the drawing module 240 draws the object in the game space to the frame buffer 274 on the basis of the object data after geometry processing (perspective transformation) and the texture stored in the texture storage module 276.

The data stored in the frame buffer 274 is sent through a bus and the image is drawn. When coordinates is input to the touch panel 300 and the scrolling of the point of view is performed by the image processing module 230 according to the input coordinates, the game image according to the scrolled point of view is read from the frame buffer 274 and then the game image is sent to the display module 290.

In this way, the scrolling screen apparatus of the present invention functions as the game apparatus 20 having computer graphics.

INDUSTRIAL APPLICABILITY

The present invention relates to a scrolling screen apparatus to scroll the display screen, etc. The scrolling screen apparatus can be applied to game apparatuses or car navigation apparatuses. Therefore the present invention can be used preferably in game industry and navigation system industry.

1 Image display device
2 Image storage device
3 Coordinate input device
4 Coordinate storage device
5 Control device
6 Coordinate extraction device
10 Scrolling screen apparatus
20 Game apparatus
200 Processing module
210 Image processing module
220 Game processing module
232 Geometry processing module
234 Normal vector processing module
240 Drawing module
242 Texture mapping module
244 Shading module
250 Sound processing module
260 Operating module
261 Touch screen
262 Card reader
263 Panel
264 Light source
265 Image sensor
270 Temporary storage module
272 Main memory
274 Frame buffer
276 Texture storage module
280 Game data storage module
290 Display module
292 Sound output module
294 Portable data storage apparatus
296 Communication module
300 Touch panel

The invention claimed is:

1. A scrolling screen apparatus comprising:
an image display device which can display an image;
an image storage device which stores image data to be displayed in the image display device;
a coordinate input device to input coordinates on the image display device;
a coordinate storage device which stores touch coordinates which are a first input to the coordinate input device, release coordinates which were input just before the termination of coordinate inputting to the coordinate input device and a plurality of sampling coordinates which are input to the coordinate input device between the input of the touch coordinates and the input of the release coordinates; and
a control device which makes the image display device display the image read from the image storage device, and scrolls the display screen of the image display device corresponding to the data of each input coordinate stored in the coordinate storage device,
and wherein the control device,
scrolls the display screen by the amount of displacement corresponding to the displacement vector of each input coordinate, in a displacement scroll mode between the input of the touch coordinates and the input of the release coordinates to the coordinate input device, and
scrolls the display screen by the amount of displacement corresponding to the scroll distance which is the sum total of the distances between each adjoining coordinate point of the touch coordinates read from the coordinate storage device, in an inertia scroll mode after the input of release coordinates.

2. A scrolling screen apparatus in accordance with claim 1, wherein after the input of the release coordinate to the coordinate input device,
when the scroll distance is longer than a predetermined threshold value, the control device performs control in the inertia scroll mode, and
when the scroll distance is shorter than the predetermined threshold value, the control device stops scrolling of the display screen.

3. A scrolling screen apparatus in accordance with claim 1, further comprises a coordinate extraction device which extracts the plurality of sampling coordinates, which are input to the coordinate input device within a predetermined period of time just before the input of the release coordinates to the coordinate input device, from the coordinate storage device, and
wherein the control device scrolls the display screen by the amount of displacement corresponding to the scroll distance which is the sum total of the distances between each sampling coordinate and the release coordinates, which are extracted by coordinate extraction device, in the inertia scroll mode.

4. A scrolling screen apparatus in accordance with claim 1, wherein the image storage device stores image data of a game space to be displayed in the image display device,
the control device reads the image data of the game space from the image storage device and makes the image display device display the image data, and scrolls a point of view in the game space to be displayed in the image display device corresponding to the data of each input coordinate stored in the coordinate storage device,
the control device scrolls the point of view by the amount of displacement corresponding to the displacement vector of each input coordinate and displays the game space in the image display device on the basis of the point of view in the displacement scroll mode, and
the control device scrolls the point of view by the amount of displacement corresponding to the scroll distance which is the sum total of the distances between each adjoining coordinate point of the touch coordinates read from the coordinate storage device and displays the game space in the image display device on the basis of the point of view in the inertia scroll mode.

5. The scrolling screen apparatus in accordance with claim 1, wherein the touch coordinates form a winding track pattern.

6. A method for scrolling screen to read image data from a image storage device, display the image in an image display device, and scroll the display screen of the image display device on the basis of data of each input coordinate stored in a coordinates storage device, comprising:
inputting coordinates on the image display device to a coordinate input device;
storing touch coordinates which are a first input to the coordinate input device, release coordinates which were input just before the termination of coordinate inputting to the coordinate input device and a plurality of sampling coordinates which are input to the coordinate input device between the input of the touch coordinates and the input of the release coordinates to a coordinate storage device;

scrolling the display screen by the amount of displacement corresponding to the displacement vector of each input coordinate, between the input of the touch coordinates and the input of the release coordinates to the coordinate input device; and scrolling the display screen by the amount of displacement corresponding to the scroll distance which is the sum total of the distances between each adjoining coordinate point of the touch coordinates, after the input of the release coordinates to the coordinate input device.

7. The method for scrolling a screen in accordance with claim 6, wherein the touch coordinates form a winding track pattern.

8. A game apparatus comprising a card reader, a touch panel which displays data read by the card reader and a scrolling screen apparatus which scrolls the display screen of the touch panel, wherein the card reader comprises:

a panel where a card printed code containing predetermined card data is set on; and a detection device which reads the code of the card set on the panel and detects the card data, the touch panel comprises:

an image display device which can display image; and a coordinate input device to input coordinates on the image display device, the scrolling screen apparatus comprises:

an image storage device which stores image data to be displayed in the image display device of the touch panel;

a coordinate storage device which stores touch coordinates which are a first input to the coordinate input device of the touch panel, release coordinates which were input just before the termination of coordinate inputting to the coordinate input device and the plurality of sampling coordinates which are input to the coordinate input device between the input of the touch coordinates and the input of the release coordinates; and a control device which reads the image data from the image storage device on the basis of the card data detected by the detection device of the card reader, makes the image display device of the touch panel display the image data, and scrolls the display screen of the image display device corresponding to the data of each input coordinate stored in the coordinate storage device, and the control device:

scrolls the display screen by the amount of displacement corresponding to the displacement vector of each input coordinate, in the displacement scroll mode between the input of the touch coordinates and the input of the release coordinates to the coordinate input device, and scrolls the display screen by the amount of displacement corresponding to the scroll distance which is the sum total of the distances between each adjoining coordinate point of the touch coordinates read from the coordinate storage device, in the inertia scroll mode after the input of the release coordinates.

9. The game apparatus in accordance with claim 8, wherein the touch coordinates form a winding track pattern.

* * * * *